US010949898B2

(12) United States Patent
Manfield et al.

(10) Patent No.: US 10,949,898 B2
(45) Date of Patent: Mar. 16, 2021

(54) SCORING CHARGING EVENTS FOR ELECTRIC VEHICLES

(71) Applicant: Recargo, Inc., Venice, CA (US)

(72) Inventors: Lucas Manfield, Venice, CA (US); Forrest North, Venice, CA (US); Armen Petrosian, Venice, CA (US); Nick Wild, Venice, CA (US)

(73) Assignee: RECARGO, INC., El Segundo, CA (US)

( * ) Notice: Subject to any disclaimer, the term of this patent is extended or adjusted under 35 U.S.C. 154(b) by 456 days.

(21) Appl. No.: 14/341,736

(22) Filed: Jul. 25, 2014

(65) Prior Publication Data
US 2015/0032659 A1 Jan. 29, 2015

Related U.S. Application Data

(60) Provisional application No. 61/858,934, filed on Jul. 26, 2013, provisional application No. 61/937,397, filed on Feb. 7, 2014.

(51) Int. Cl.
*G06Q 30/02* (2012.01)
*B60L 3/12* (2006.01)
(Continued)

(52) U.S. Cl.
CPC .......... *G06Q 30/0282* (2013.01); *B60L 1/003* (2013.01); *B60L 1/02* (2013.01);
(Continued)

(58) Field of Classification Search
CPC ............ B60L 2240/72; G06Q 30/0282; G06Q 50/30; Y02T 10/62; Y02T 10/64;
(Continued)

(56) References Cited

U.S. PATENT DOCUMENTS 7,895,127 B2 *  2/2011  Weiser ............... G06Q 30/0278
                                                    705/306
7,912,637 B2 *  3/2011  Horvitz .............. G01C 21/3476
                                                    701/33.4

(Continued)

FOREIGN PATENT DOCUMENTS

EP  2578997 A1  10/2013

OTHER PUBLICATIONS

Katie Fehrenbacher, "PlugShare Boosts Social Mobile for Electric Car Charging." Jul. 28, 2011. https://gigaom.com/2011/07/28/plugshare-boosts-social-mobile-for-electric-car-charging/.*

(Continued)

*Primary Examiner* — Lynda Jasmin
*Assistant Examiner* — Johnathan J Lindsey, III
(74) *Attorney, Agent, or Firm* — AMPACC Law Group, PLLC

(57) ABSTRACT

A system and method for ranking or scoring charging stations and/or charging events or sessions, and/or performing actions based on the ranking or scoring is described. In some embodiments, a charging station ranking engine is configured to rank charging stations, or potential charging events, based on feedback received from users of the charging stations, such as drivers of electric vehicles, or other dynamically determined factors.

13 Claims, 10 Drawing Sheets

(51) Int. Cl.
| | |
|---|---|
| *B60L 1/00* | (2006.01) |
| *B60L 1/02* | (2006.01) |
| *B60L 1/14* | (2006.01) |
| *G06Q 50/30* | (2012.01) |
| *B60L 53/66* | (2019.01) |
| *B60L 53/65* | (2019.01) |
| *B60L 53/68* | (2019.01) |
| *B60L 53/64* | (2019.01) |
| *B60L 50/62* | (2019.01) |
| *B60L 50/52* | (2019.01) |
| *B60L 53/63* | (2019.01) |
| *B60L 53/14* | (2019.01) |
| *B60L 53/30* | (2019.01) |

(52) U.S. Cl.
CPC ............... *B60L 1/14* (2013.01); *B60L 3/12* (2013.01); *B60L 50/52* (2019.02); *B60L 50/62* (2019.02); *B60L 53/14* (2019.02); *B60L 53/305* (2019.02); *B60L 53/63* (2019.02); *B60L 53/64* (2019.02); *B60L 53/65* (2019.02); *B60L 53/665* (2019.02); *B60L 53/68* (2019.02); *G06Q 50/30* (2013.01); *B60L 2240/12* (2013.01); *B60L 2240/14* (2013.01); *B60L 2240/34* (2013.01); *B60L 2240/36* (2013.01); *B60L 2240/421* (2013.01); *B60L 2240/425* (2013.01); *B60L 2240/445* (2013.01); *B60L 2240/622* (2013.01); *B60L 2240/665* (2013.01); *B60L 2240/72* (2013.01); *B60L 2240/80* (2013.01); *B60L 2250/22* (2013.01); *Y02E 60/00* (2013.01); *Y02T 10/62* (2013.01); *Y02T 10/64* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(58) Field of Classification Search
CPC ..... Y02T 10/70; Y02T 10/7072; Y02T 10/72; Y02T 90/12; Y02T 90/14; Y02T 90/16; Y02T 90/167
USPC .......................... 705/347; 701/29.1, 438, 439
See application file for complete search history.

(56) References Cited

U.S. PATENT DOCUMENTS

| | | | | |
|---|---|---|---|---|
| 8,239,130 B1* | 8/2012 | Upstill | ............... | G01C 21/3679 701/400 |
| 8,401,786 B2* | 3/2013 | Poppen | .............. | G01C 21/3476 340/438 |
| 8,433,512 B1* | 4/2013 | Lopatenko | ......... | G01C 21/3679 701/400 |
| 8,566,029 B1* | 10/2013 | Lopatenko | .......... | G08G 1/0962 701/400 |
| 8,589,069 B1* | 11/2013 | Lehman | ................ | G01C 21/20 340/995.1 |
| 8,884,784 B2* | 11/2014 | Kirsch | ................ | G08G 1/143 340/932.2 |
| 9,008,888 B1* | 4/2015 | Gravino | ............. | G01C 21/3682 701/26 |
| 9,317,086 B2* | 4/2016 | Sellschopp | ............... | B60L 3/12 |
| 9,348,381 B2* | 5/2016 | Khoo | ................... | B60L 11/1825 |
| 9,494,445 B2* | 11/2016 | Thomas | ............ | G01C 21/3697 |
| 9,744,871 B2* | 8/2017 | Sabripour | ........... | B60L 11/1824 |
| 2006/0053038 A1* | 3/2006 | Warren | ................ | G06Q 40/08 705/4 |
| 2009/0063247 A1* | 3/2009 | Burgess | ................ | G06Q 30/02 705/7.34 |
| 2009/0281885 A1 | 11/2009 | Castelli et al. | | |
| 2009/0313103 A1* | 12/2009 | Ambrosio | .......... | G06Q 30/0222 705/14.25 |
| 2010/0211340 A1* | 8/2010 | Lowenthal | .............. | B60L 58/12 702/63 |
| 2011/0032110 A1* | 2/2011 | Taguchi | .................. | B60L 3/12 340/636.1 |
| 2011/0118978 A1* | 5/2011 | Li | ...................... | G01C 21/3679 701/408 |
| 2011/0191186 A1* | 8/2011 | Levy | ...................... | G06Q 30/00 705/14.58 |
| 2011/0307280 A1* | 12/2011 | Mandelbaum | ....... | G06Q 10/025 705/6 |
| 2012/0078667 A1* | 3/2012 | Denker | .............. | G06Q 30/0643 705/5 |
| 2012/0086395 A1* | 4/2012 | Kim | ..................... | B60L 11/1838 320/109 |
| 2012/0109519 A1* | 5/2012 | Uyeki | ..................... | B60L 53/14 701/439 |
| 2012/0173292 A1* | 7/2012 | Solomon | ................ | G06Q 10/02 705/5 |
| 2012/0179323 A1* | 7/2012 | Proffitt-Brown | ....... | G01C 21/26 701/29.1 |
| 2012/0216123 A1* | 8/2012 | Shklovskii | .......... | G06Q 30/0201 715/738 |
| 2012/0233077 A1* | 9/2012 | Tate, Jr. | ................ | B60L 53/305 705/65 |
| 2012/0256588 A1* | 10/2012 | Hayashi | .................... | B60L 3/12 320/109 |
| 2012/0296678 A1* | 11/2012 | Boot | ....................... | G06Q 10/02 705/5 |
| 2013/0020992 A1* | 1/2013 | Wu | ........................ | H01M 10/44 320/109 |
| 2013/0024112 A1* | 1/2013 | Tate, Jr. | ............. | B60L 11/1862 701/439 |
| 2013/0054281 A1* | 2/2013 | Thakkar | .................. | G06Q 50/30 705/5 |
| 2013/0090936 A1* | 4/2013 | Solomon | ................ | G06Q 30/02 705/1.1 |
| 2013/0110296 A1* | 5/2013 | Khoo | ................... | B60L 11/1825 700/286 |
| 2013/0151293 A1* | 6/2013 | Karner | ................ | G06Q 20/102 705/5 |
| 2013/0179057 A1* | 7/2013 | Fisher | ................ | B60L 11/1861 701/117 |
| 2013/0179840 A1* | 7/2013 | Fisher | ................ | G06F 3/04842 715/835 |
| 2013/0222158 A1* | 8/2013 | Dai | ........................ | G06Q 50/30 340/995.13 |
| 2013/0226441 A1* | 8/2013 | Horita | ................ | G01C 21/3469 701/118 |
| 2014/0089064 A1* | 3/2014 | Hyde | .................. | G06Q 30/0611 705/14.4 |
| 2014/0091747 A1* | 4/2014 | Uyeki | .................... | B60L 11/184 320/101 |
| 2014/0114705 A1* | 4/2014 | Bashvitz | ............. | G06Q 10/047 705/5 |
| 2014/0129139 A1* | 5/2014 | Ellison | ................ | G01C 21/3469 701/533 |
| 2014/0142770 A1* | 5/2014 | Sellschopp | ......... | B60L 11/1838 700/291 |
| 2014/0222486 A1* | 8/2014 | Kamel | ................ | H02J 13/0006 705/7.22 |
| 2014/0278837 A1* | 9/2014 | Blumer | .................. | G07B 15/00 705/13 |
| 2014/0279707 A1* | 9/2014 | Joshua | ................... | G06Q 30/0283 705/400 |
| 2014/0354228 A1* | 12/2014 | Williams | ................ | B60L 53/63 320/109 |
| 2014/0358749 A1* | 12/2014 | Williams | ................ | G06Q 30/04 705/34 |
| 2015/0310450 A1* | 10/2015 | Fairbanks | ............ | G06Q 30/018 705/317 |

(56) References Cited

OTHER PUBLICATIONS

14341736 NPL—EIC 3600 Search Report Jun. 5, 2020 (Year: 2020).*
14341736 EIC Search 3600 Report Jun. 5, 2020 (Year: 2020).*
14341736 EIC Search 3600 Report Dec. 17, 2020 (Year: 2020).*
International Search Report and Written Opinion for PCT/US2014/048311, filed Jul. 25, 2014.

* cited by examiner

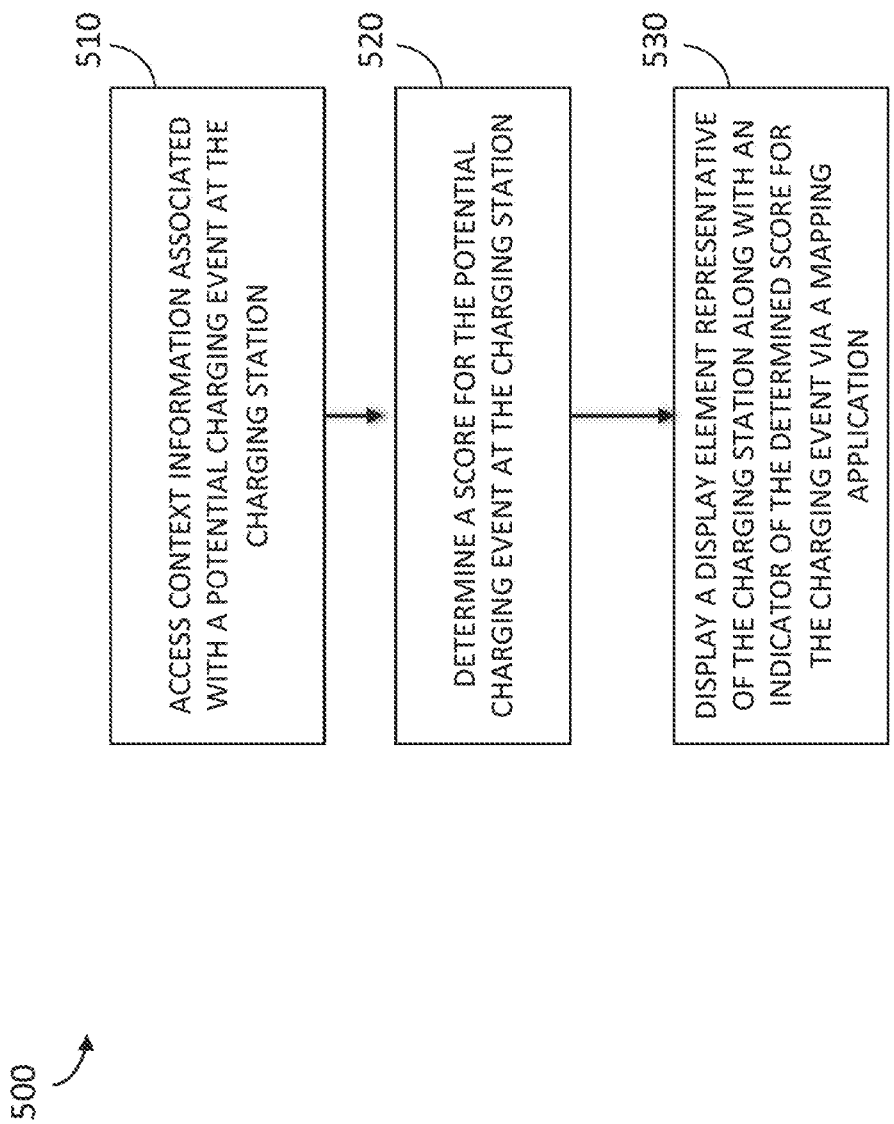

SCORING CHARGING EVENTS FOR ELECTRIC VEHICLES

CROSS REFERENCE TO RELATED APPLICATIONS

This application claims priority to U.S. Provisional Patent Application No. 61/858,934, filed on Jul. 26, 2013, entitled RANKING ELECTRIC VEHICLE CHARGING STATIONS, and U.S. Provisional Patent Application No. 61/937,397, filed on Feb. 7, 2014, entitled SCORING CHARGING EVENTS FOR ELECTRIC VEHICLES, which are hereby incorporated by reference in their entirety.

BACKGROUND

Although the adoption of electric vehicles is increasing, there are still many people that find them confusing or inaccessible, or are otherwise not interested in using electric vehicles for their transportation needs. Therefore, technology is being developed to remove such barriers associated with the adoption of electric vehicles.

BRIEF DESCRIPTION OF THE DRAWINGS

FIG. 5 is a flow diagram illustrating a method for performing an action associated with a potential charging event.

DETAILED DESCRIPTION

Overview

A system and method for ranking or scoring charging stations and/or charging events or sessions, and/or performing actions based on the ranking or scoring is described. In some embodiments, a charging station ranking engine is configured to rank charging stations, or potential charging events, based on feedback received from users of the charging stations, such as drivers of electric vehicles, or other dynamically determined factors. For example, the charging event ranking engine may rank a potential or prospective charging event at a charging station based on a current or dynamically determined suitability of the charging station for a specific electric vehicle.

The charging station ranking engine may perform various actions based on the rankings, such as display the rankings, highlight highly ranked charging stations in a mapping application, provide rewards to owners of highly ranked charging stations, and so on.

In some embodiments, a charging event ranking engine is configured to rank and/or score charging events and/or charging sessions between a charging station and an electric vehicle. For example, the charging event ranking engine may rank or score commenced or completed charging events and/or charging sessions based on determining how efficient, cost-effective, and/or green the events or sessions were.

The ranking engines and various performed methods will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

As described herein, various systems and methods for ranking charging stations and/or charging events are described.

Figure 1:
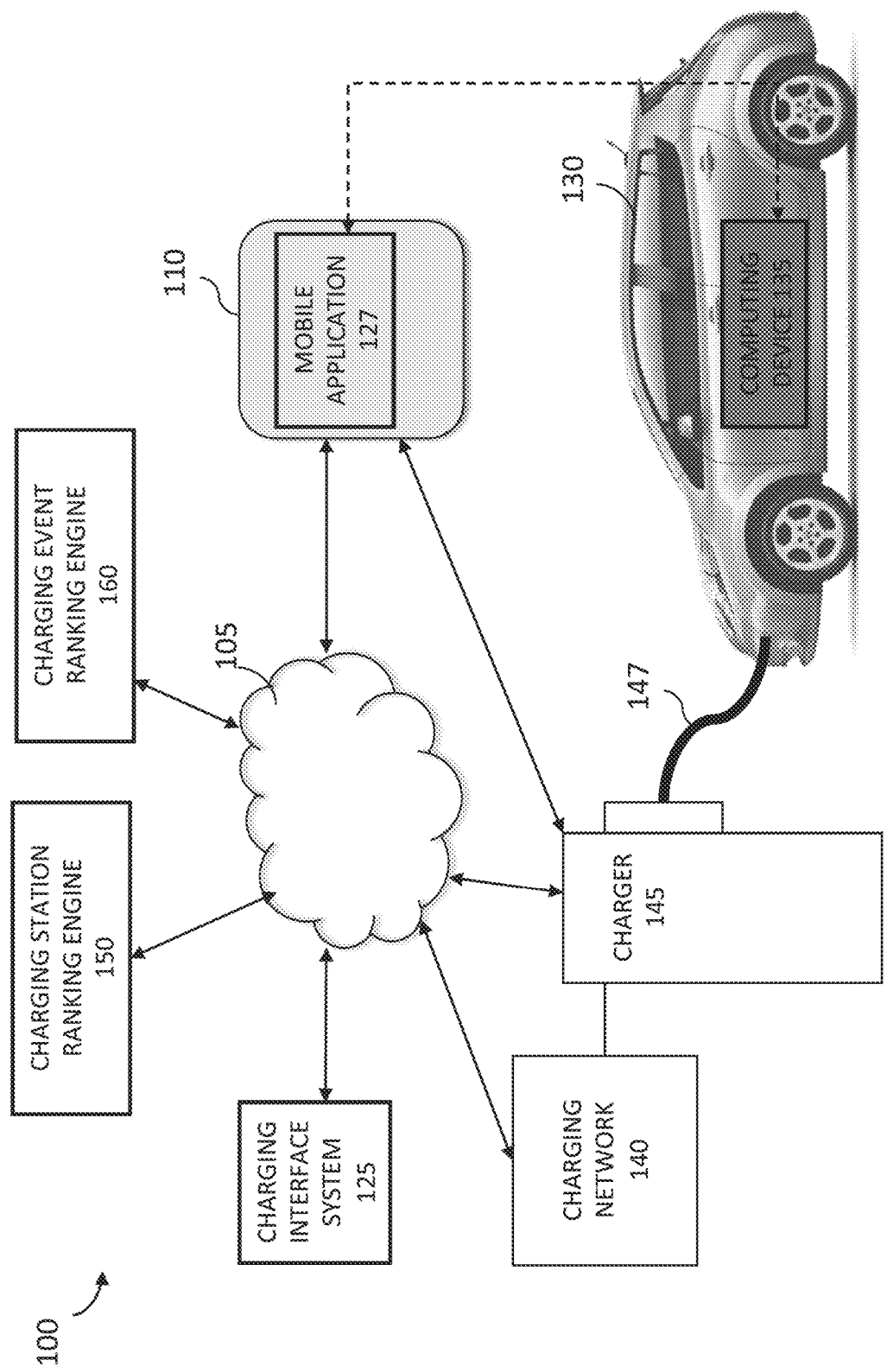
FIG. 1 is a block diagram illustrating components of a suitable computing environment.

FIG. 1 illustrates components of a suitable computing environment 100 in which the systems and methods for ranking charging stations and/or charging events may be supported and/or implemented. The computing environment 100 includes a mobile device 110, such as a mobile phone or tablet computer that supports and provides applications (e.g., "apps") to a user of the mobile device 110. For example, the mobile device 110 may include a mobile application 127 provided by the charging interface system 125. The mobile application 127 may communicate with the charging interface system 125, one or more charging networks 140, a charging station 145, and/or a computing device 135 supported by an electric vehicle 130, over a network 105, such as the internet or other wireless or telecommunication networks. The electric vehicle (EV) 130 (e.g., a vehicle, plugin hybrid, range extended hybrid, electric traction or battery or plugin vehicle) is connected to the charging station 145 via a charging cable 147, which provides charge to a battery pack of the EV 130.

The mobile device 110 may be a tablet computer, mobile device, smart-phone, net-book, mobile GPS navigation device, or any other device that supports, presents, and/or displays apps via a user interface, such as a touch-screen, of the device. The mobile device 110 includes various hardware and/or software components in order to provide such functionality. For example, the mobile device 110 includes various human interface components, device components, and memory, and so on.

The mobile device 110 may include a touch-screen or other input component that provides input to a processor. The touch-screen may include or communicate with a hardware controller, such as a touch-screen driver, that interprets raw signals received from the touch-screen and transmits information associated with a contact event (e.g., a pressing of an app via the touch-screen), to the processor. The touch-screen may be part of a display, such as a touch-screen display, a flat panel display, an electronic ink display, a head-mounted display, a liquid crystal display, a light-emitting diode display, a plasma panel display, an electro-luminescent display, a vacuum fluorescent display, a digital projector, a laser projector, a heads-up display, and so on. The mobile device 110 may include other interface components, such as a speaker that provides appropriate auditory signals to assist a user in navigating a touch-screen, and so on.

The mobile device 110 may include various device components, such as sensors (e.g., GPS or other location determination sensors, motion sensors, gyroscopes, light sensors, and so on), removable storage devices (e.g., SIM cards), cameras and other video capture devices, microphones and other audio capture devices, communication devices (e.g., Bluetooth devices, radios, antennas), and so on.

The mobile device 110 may include a processor that communicates with data or applications stored in memory of the device 110, which may include a combination of temporary and/or permanent storage, and both read-only and writable memory (random access memory or RAM), read-only memory (ROM), writable non-volatile memory such as FLASH memory, hard drives, floppy disks, SIM-based components, and so on. The memory may include various program components or modules, such as an operating system, and various applications, such as applications downloaded to the device 110. For example, the memory may store applications native to the device that perpetually operate on the device (e.g., a keyboard application that provides a virtual keyboard, a text messaging application, and so on) as well as applications that are downloaded by a user and launched by the device (e.g., applications associated with social networking sites, games, and so on).

The memory may store one or more applications associated with an electric vehicle, such as the mobile application 127, which facilitates communications between the mobile device 110 and an electric vehicle 130, the computing device 135 of the electric vehicle 130, the charging network 140, the charging station 145, and/or a server supporting the charging interface system 125.

For example, the mobile application 127 may communicate over the network 105 with the computing device 135 of the electric vehicle 130, the charging network 140, the charging station 145, and/or the charging interface system 125. The network 105 may be a Local Area Network (LAN), a Wide Area Network (WAN), the Internet, or other networks capable of facilitating various communications between computing devices.

In some example embodiments, the mobile application 127 may communicate directly with various components of the computing environment 100. The mobile device 110 may include various communication components (e.g., Bluetooth) that facilitate short range, near field, and/or other direct or personal area network communications between devices. For example, the mobile application 127 may utilize Bluetooth communication to exchange data with the charging network 140 and/or the charging station 145 when other networks are unavailable or inaccessible (e.g., when the EV 130 is at the charging station 145 in an underground parking lot that does not receive sufficient wireless or telecommunication signals).

The computing device 135 of the electric vehicle 130 may include various computing components and/or modules configured and/or programmed to control, manage, diagnose, or otherwise interact with components of the electric vehicle 130. For example, the EV computing device 135 may include an on-board computing system that includes on-board diagnostics, such as components configured and/or programmed to detect and/or receive information from the electric vehicle's engine, battery pack, various sensors, dashboard controls, and so on. The components may detect, sense, and/or capture various types of information, such as outside temperature information, inside temperature information, internal engine or component temperatures, motor rpm information, motor temperature information, power consumption information, charger temperature information, information associated with peak power consumption, location or geographical information, tire pressure information, tire temperature information, information captured by seat pressure sensors, error codes or other operational information, and so on. For example, the components may detect, receive, and/or access motor controller information, such as information associated with the power, voltage, current, frequency, waveform, modulation, and/or regenerative power of the motor of the EV, as well as information from modules which control ancillary functions of the EV, such as information associated with operations of the lights, wipers, anti-lock brakes, seat warmers, music, climate controls, light sensors, smoke sensors, acceleration sensors, and other ancillary operations of an EV.

In some example embodiments, the computing environment 100 includes a charging station ranking engine 150 that is configured to access information associated with electric vehicle charging stations, determine rankings and/or scores for the electric vehicle charging stations, and display, or cause to be displayed, information within a map displayed by the mobile application 125 that presents the rankings or scores along with icons representing the electric vehicle charging stations, among other things. As described herein, the charging station ranking engine 150 may also perform other actions that are based on or otherwise associated with the rankings or scores of the charging stations.

In some example embodiments, the charging station ranking engine 150 may access information associated with potential or prospective charging events or sessions, determine rankings and/or scores for the charging events, and perform actions associated with the ranked charging events.

In some example embodiments, the computing environment 100 includes a charging event ranking engine 160 that is configured to access information associated with completed charging events or sessions, determine rankings and/or scores for the charging events, and perform actions associated with the ranked charging events.

FIG. 1 and the discussion herein provide a brief, general description of a suitable computing environment in which the charging interface system 125 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein. Moreover, any two or more of the machines, databases, or devices illustrated in FIG. 1 may be combined into a single machine, and the functions described herein for any single machine, database, or device may be subdivided among multiple machines, databases, or devices.

Examples of Ranking Electric Vehicle Charging Stations

As described herein, the charging station ranking engine 150 includes components, modules, and/or engines that perform various algorithms, processes, and/or methods to score or rank electric vehicle charging stations and/or cause a mapping application, such as mobile application 125, to display a map of charging stations along with indicators that represent scores or rankings assigned to the displayed charging stations, among other things.

Figure 2:
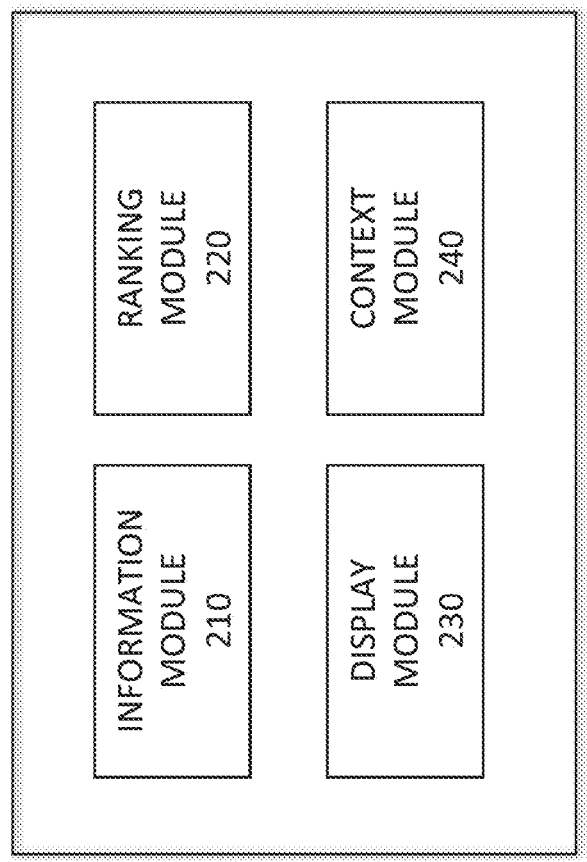
FIG. 2 is a block diagram illustrating the components of a charging station ranking engine.

FIG. 2 is a block diagram illustrating the components of the charging station ranking engine 150. In some example embodiments, the charging station ranking engine 150 may include one or more modules and/or components to perform one or more operations of the charging station ranking engine 150. The modules may be hardware, software, or a combination of hardware and software, and may be executed by one or more processors. For example, the charging station ranking engine 150 may include an information module 210, a ranking module 220, a display module 230, and a context module 240.

In some example embodiments, the information module 210 is configured and/or programmed to access or receive information associated with multiple charging stations and/or potential charging events at the charging stations. For example, the information module 210 may access information received or captured by the mobile application 125 and associated with charging stations displayed by a map provided by the mobile application.

Example types of information may include check-in information (which may include reviews, feedback, user interactions, and/or other binary information or other information input by users of electric vehicles to the mobile application 125.

In some example embodiments, the ranking module 220 is configured and/or programmed to rank each of the charging stations and/or potential charging events based on the accessed information. For example, the ranking module 220 may generate, calculate, or otherwise determine a score or ranking for some or all of the charging stations displayed by the mobile application 125.

The ranking module 220 may assign rankings or scores to the charging stations in a variety of ways and using a variety of scoring or ranking formats. For example, the ranking module 220 may rank or score charging stations by determining a score between 1 and 10 (or greater) for each of the charging stations that is based on a date-weighted average of binary station reviews received during check-in actions at the charging stations. As another example, the ranking module 220 may rank or score charging stations by determining a score between 1 and 10 for each of the charging stations that is based on information received during a most recent check-in action.

Furthermore, the ranking module 220 may assign various types of ranking or scoring formats to the charging stations, such as numerical formats (e.g., a number between a range, such as 1-10), binary formats (e.g., a score or rank that identifies the station as satisfactory or not), and so on.

In some example embodiments, the display module 230 is configured and/or programmed to display icons representative of the charging stations along with indicators for rankings assigned to each of the charging stations within a mapping application supported by a mobile device. For example, the display module 230 may display indicators such as text or other informational indicators, color-coded indicators, stars or other ranking indicators, and so on.

In some example embodiments, the context module 240 is configured and/or programmed to access context information associated with a potential charging event at a charging station. For example, the context module 240 may access information identifying a state of charge for an electric vehicle to be charged during the potential charging event, a route to be traveled from a current location of the electric vehicle and a location of the charging station, and/or information associated with reviews of previous charging events at the charging station. As another example, the context module 240 may access information identifying a state of charge for an electric vehicle to be charged during the potential charging event and a route to be traveled from a current location of the electric vehicle and a location of the charging station. As another example, the context module 240 may access information identifying a cost to charge the electric vehicle during the potential charging event and information associated with reviews of previous charging events at the charging station. Of course, the context module 240 may access other types of information associated with a potential charging event at a charging station.

In some example embodiments, the ranking module 220, when determining a score for a potential charging event at a charging station, may update a score previously assigned to the charging station (e.g., a score based on reviews) based on the accessed context information. For example, the ranking module 220 may update a score previously assigned to the charging station based on information identifying a state of charge for an electric vehicle to be charged during the potential charging event, may update a score previously assigned to the charging station based on information identifying a predicted route currently traveled by an electric vehicle to be charged during the potential charging event, and so on.

Figure 3:
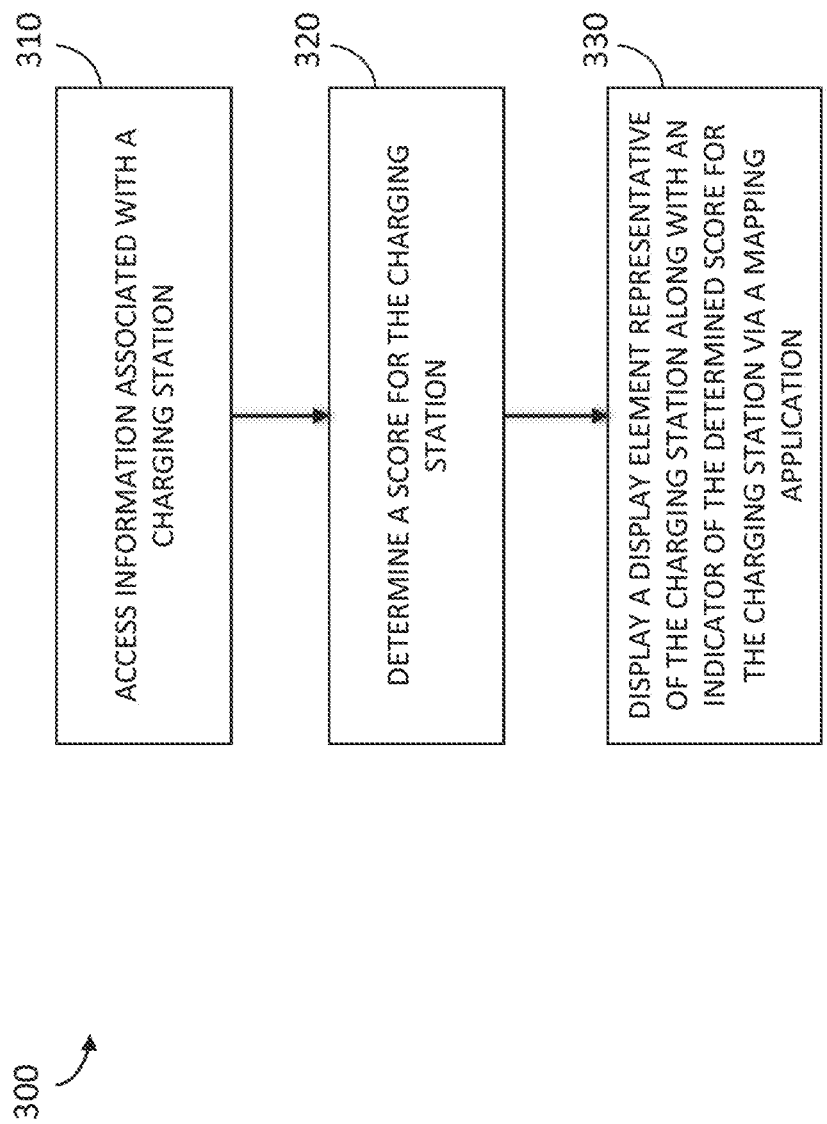
FIG. 3 is a flow diagram illustrating a method for ranking electric vehicle charging stations.

FIG. 3 is a flow diagram illustrating a method for ranking electric vehicle charging stations. The method 300 may be performed by the charging station ranking engine 150 and, accordingly, is described herein merely by way of reference thereto. It will be appreciated that the method 300 may be performed on any suitable hardware.

In operation 310, the charging station ranking engine 150 accesses information associated with a charging station, For example, the information module 210 accesses information associated with check-in actions for the charging station and provided by users of electric vehicles.

In operation 320, the charging station ranking engine 150 determines a score for the charging station based on the accessed information. For example, the ranking module 220 determines a score between 1 and 10 for the charging station that is based on a date-weighted average of binary station reviews received during the check-in actions, and/or determines a score between 1 and 10 for the charging station that is based on information received during a most recent check-in action, among other things.

The ranking module 220 may determine scores or rankings for charging stations that are based on other types of information, such as dynamically determined information (e.g., a current charge state of an electric vehicle driven by a user of the mobile application 125), vehicle destination information (e.g., information identifying a route or predicted route for an electric vehicle driven by a user of the mobile application 125), vehicle location information (e.g., a current or predicted location of an electric vehicle driven by a user of the mobile application 125), and so on.

The following code snippet provides an example of how the ranking module 220 may calculate scores for charging stations:

```
def calculate_score(loc_id):
    redis.delete("locations:%d:score" % loc_id)
    location = Location.query.get(loc_id)
    if not location:
        return False
    score = None
    #use last 10 reviews, and weight them using how far they are since now
    num_data_points = 0
    MAX_POINTS = 10
    if len(location.reviews) <= 3:
        return None
    elif len(location.reviews) <= 8:
        score = 9
    else:
        score = 10
    for review in location.reviews:
        if review.rating > 0:
            num_data_points += 1
        elif review.rating < 0:
            review_adjustment = math.sqrt(MAX_POINTS - num_data_points) - 1
            #review_score = review.rating #if review.rating > 0 else review.rating * 2
            #days_ago = math.ceil((datetime.now( ) - review.created_at).days)
            #review_adjustment = review_score * math.exp(-0.0231*days_ago) #halflife 120 days
            score += -1 * review_adjustment
            num_data_points += 1
        if num_data_points == MAX_POINTS:
            break
    if score < 0:
        score = 0
    redis.set("locations:%d:score" % location.id, score)
    return score
```

In operation 330, the charging station ranking engine 150 displays a display element representative of the charging station along with an indicator of the determined score for the charging station via a mapping application. For example, the display module 230 may display various indicators along with or proximate to icons representing charging stations for scores or rankings assigned to the charging stations, among other things.

Figure 4B:
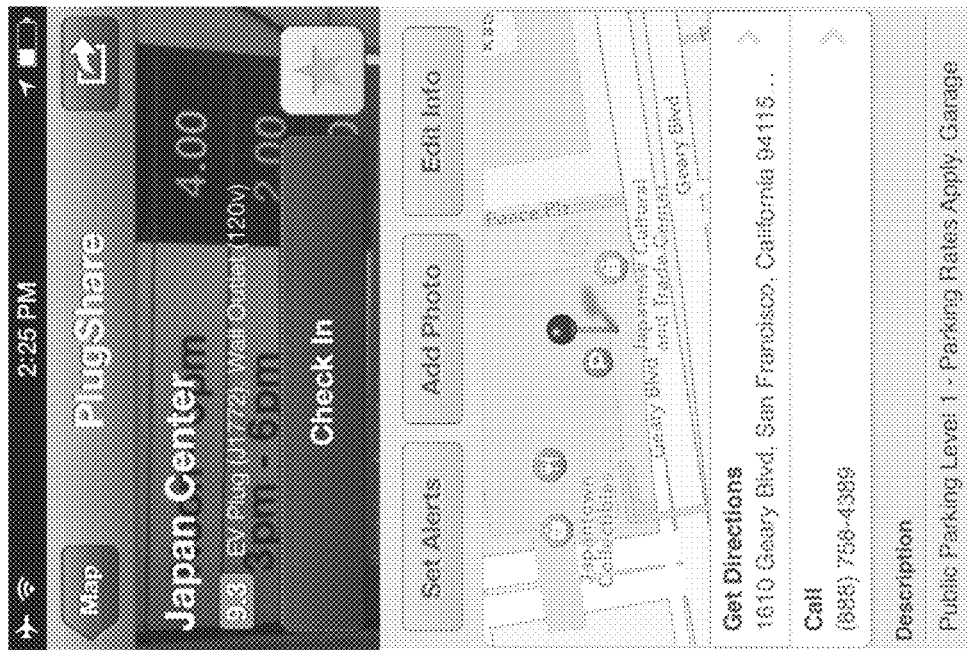
FIGS. 4A-4E are display diagrams illustrating example displays presenting ranked electric vehicle stations via a mobile application.
Figure 4A:
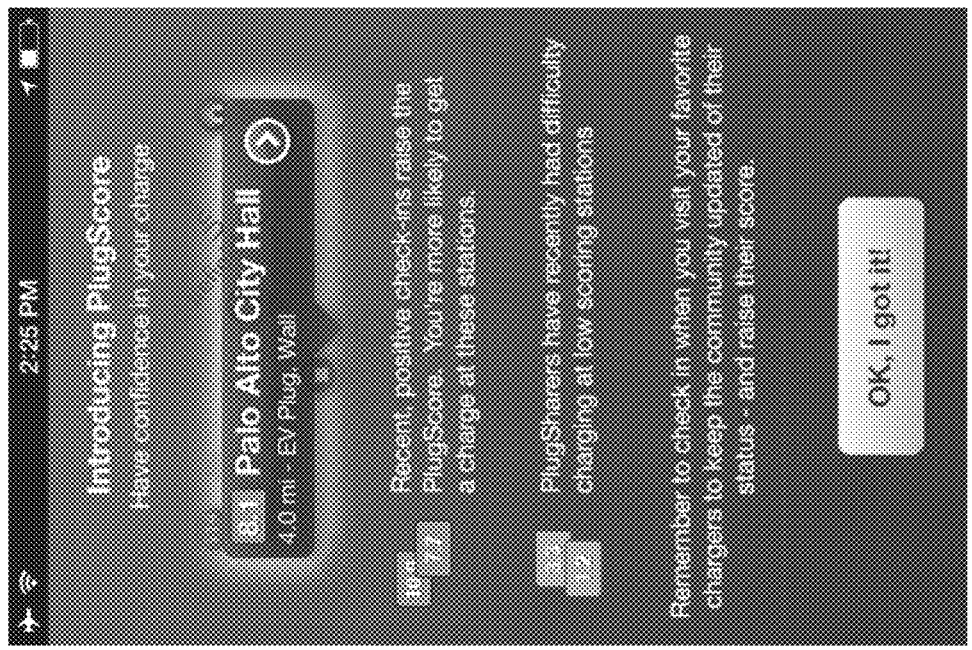
Figure 4C:
Figure 4E:
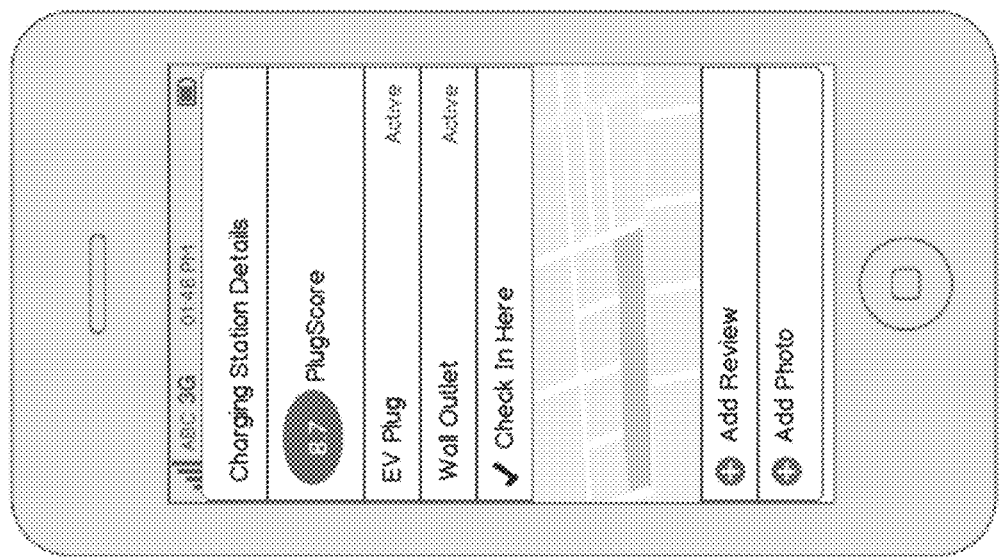
Figure 4D:
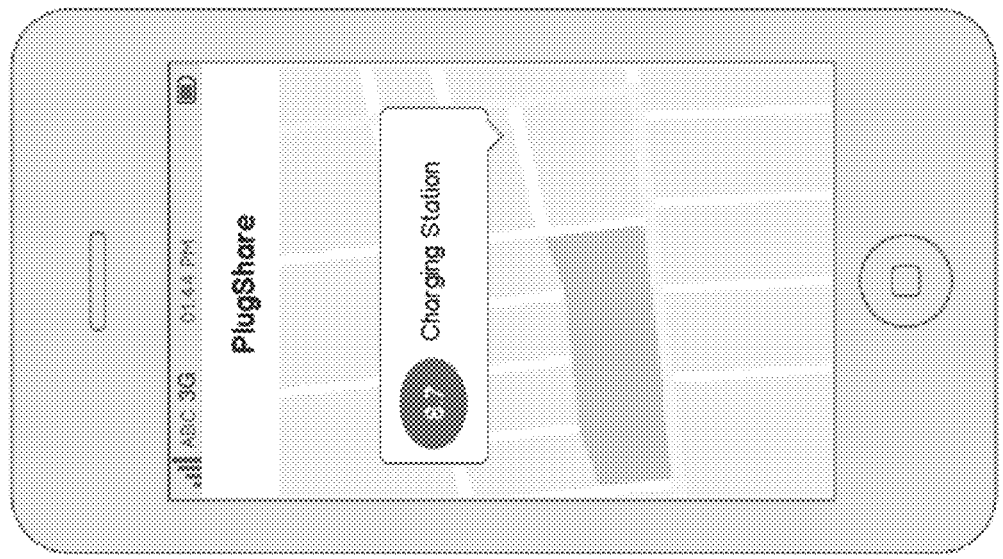

FIGS. 4A-4E are display diagrams illustrating screen shots displayed when presenting rankings associated with electric vehicle charging stations via the mobile application 125. For example, FIG. 4A depicts a screen shot of an introductory page of the mobile application 125, FIG. 4B depicts a screen shot of a check-in page that facilitates a user or driver check-in at a charging station (along with receipt of a review or feedback), and FIGS. 4C to 4E depicts screen shots that display icons representing charging stations along with scores or rankings determined by the charging station ranking engine 150 described herein, among other things.

Examples of Ranking Potential Charging Events for an Electric Vehicle

As described herein, the charging station ranking engine 150 includes components, modules, and/or engines that perform various algorithms, processes, and/or methods to score or rank potential or future charging events and/or perform actions based on the scored or ranked potential or future charging events.

FIG. 5 is a flow diagram illustrating a method 500 for performing an action associated with a potential charging event. The method 500 may be performed by the charging station ranking engine 150 and, accordingly, is described herein merely by way of reference thereto. It will be appreciated that the method 500 may be performed on any suitable hardware.

In operation 510, the charging station ranking engine 150 accesses context information associated with a potential charging event at a charging station. For example, the context module 240 may access information identifying a state of charge for an electric vehicle to be charged during the potential charging event, a route to be traveled from a current location of the electric vehicle and a location of the charging station, and/or information associated with reviews of previous charging events at the charging station.

As another example, the context module 240 may access information identifying a state of charge for an electric vehicle to be charged during the potential charging event and a route to be traveled from a current location of the electric vehicle and a location of the charging station. As another example, the context module 240 may access information identifying a cost to charge the electric vehicle during the potential charging event and information associated with reviews of previous charging events at the charging station. Of course, the context module 240 may access other types of information associated with a potential charging event at a charging station.

In operation 520, the charging station ranking engine 150 determines a score for the potential charging event at the charging station based on the accessed information. The ranking module 220 may determine scores or rankings for charging stations that are based on other types of information, such as dynamically determined information (e.g., a current charge state of an electric vehicle driven by a user of the mobile application 125), vehicle destination information (e.g., information identifying a route or predicted route for an electric vehicle driven by a user of the mobile application 125), vehicle location information (e.g., a current or predicted location of an electric vehicle driven by a user of the mobile application 125), and so on.

For example, the ranking module 220 may generate, calculate, or otherwise determine a score or ranking for some or all of the charging stations displayed by the mobile application 125. The ranking module 220 may assign rankings or scores to the charging stations in a variety of ways and using a variety of scoring or ranking formats. For example, the ranking module 220 may rank or score charging stations by determining a score between 1 and 10 (or greater) for each of the charging stations that is based on a date-weighted average of binary station reviews received during check-in actions at the charging stations. As another example, the ranking module 220 may rank or score charging stations by determining a score between 1 and 10 for each of the charging stations that is based on information received during a most recent check-in action. Furthermore, the ranking module 220 may assign various types of ranking or scoring formats to the charging stations, such as numerical formats (e.g., a number between a range, such as 1-10), binary formats (e.g., a score or rank that identifies the station as satisfactory or not), and so on.

In some example embodiments, the ranking module 220, when determining a score for a potential charging event at a charging station, may update a score previously assigned to the charging station (e.g., a score based on reviews) based on the accessed context information. For example, the ranking module 220 may update a score previously assigned to the charging station based on information identifying a state of charge for an electric vehicle to be charged during the potential charging event, may update a score previously assigned to the charging station based on information identifying a predicted route currently traveled by an electric vehicle to be charged during the potential charging event, and so on.

In operation 530, the charging station ranking engine 150 displays a display element representative of the charging station along with an indicator of the determined score for the charging station via a mapping application. For example, the display module 230 may display indicators such as text or other informational indicators, color-coded indicators, stars or other ranking indicators, and so on.

In some example embodiments, the charging station ranking engine 150 may perform various actions that are based on a ranked or scored charging event. For example, the charging station ranking engine 150 may perform an action on behalf of a driver of the electric vehicle that is based on the score determined for the potential charging event, may automatically reserve the charging station when the score determined for the potential charging event is above a threshold score, and so on.

As another example, the charging station ranking engine 150 may receive an indication that an actual charging event has occurred between the electric vehicle and the charging station, assign a score to the actual charging event that is based on the score determined for the potential charging event at the charging station, and provide a reward to a driver of the electric vehicle that is based on the score assigned to the actual charging event. In some example embodiments, the charging station ranking engine 150 may incentivize drivers of electric vehicles to utilize positively reviewed charging stations or may incentivize the drivers to charge their vehicles at charging stations that facilitate highly scored charging events or sessions.

Thus, in some example embodiments, the charging station ranking engine 150 accesses context information associated with a potential charging event at a charging station, and determines a score for the potential charging event at the charging station by updating a score previously assigned to the charging station using the context information. The charging station ranking engine 150, therefore, may provide drivers with dynamically determined scores or rankings of charging stations when they are deciding what charging stations to utilize in charging their vehicles.

Examples of Ranking Completed Charging Events for an Electric Vehicle

As described herein, the charging event ranking engine 160 includes components, modules, and/or engines that perform various algorithms, processes, and/or methods to score or rank completed charging events and/or perform actions based on the scored or ranked completed charging events.

Figure 6:
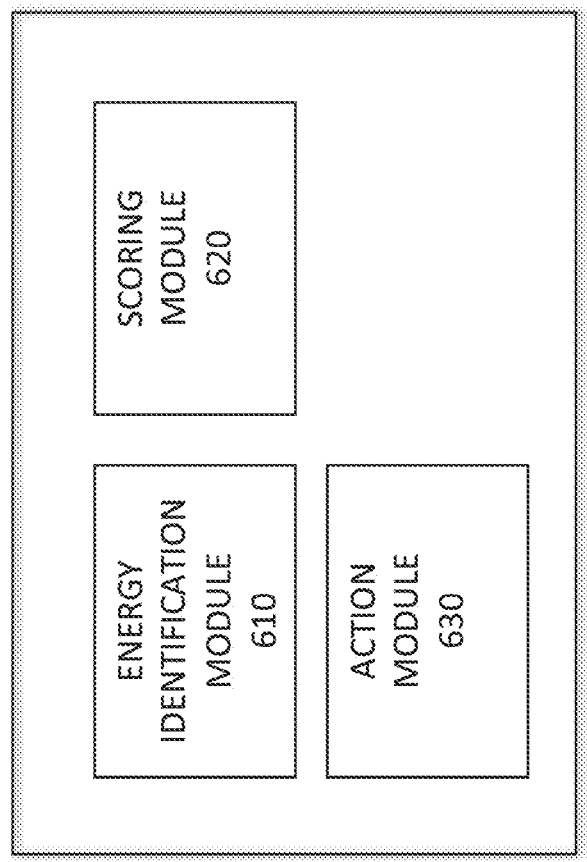
FIG. 6 is a block diagram illustrating the components of a charging event ranking engine.

FIG. 6 is a block diagram illustrating the components of the charging event ranking engine 160. In some example embodiments, the charging event ranking engine 160 may include one or more modules and/or components to perform one or more operations of the charging event ranking engine 160. The modules may be hardware, software, or a combination of hardware and software, and may be executed by one or more processors. For example, the charging event ranking engine 160 may include an energy identification module 610, a scoring module 620, and an action module 630.

In some example embodiments, the energy identification module 610 is configured and/or programmed to access information associated with a charging event at an electric vehicle. For example, the energy identification module 610 may access information associated with an energy source (e.g., a wind energy source, a solar energy source, a biofuel source, and/or other renewable energy sources) used to provide energy to the electric vehicle during the charging event, information associated with a cost of energy provided to the electric vehicle during the charging event, information associated with a ranking assigned to a charging station used during the charging event, and so on.

In some example embodiments, the scoring module 620 is configured and/or programmed to score the charging event based on the accessed information. For example, the scoring module 620 may assign a relatively high score to the charging event when a renewable energy source is used to provide energy to the electric vehicle during the charging event, may assign a relatively low score to the charging event when the charging event occurs during a peak energy time period for an electric grid that provided the energy to the electric vehicle during the charging event, and so on. The scoring module 620 may perform some or all of the techniques described herein when scoring or ranking a charging event.

In some example embodiments, the action module 630 is configured and/or programmed to perform an action associated with the scored charging event. For example, the action module 630 may display an indication of a score assigned to the charging event via a mapping application associated with a driver of the electric vehicle, may present a reward to a driver of the electric vehicle that is based on a score assigned to the charging event, and so on.

Figure 7:
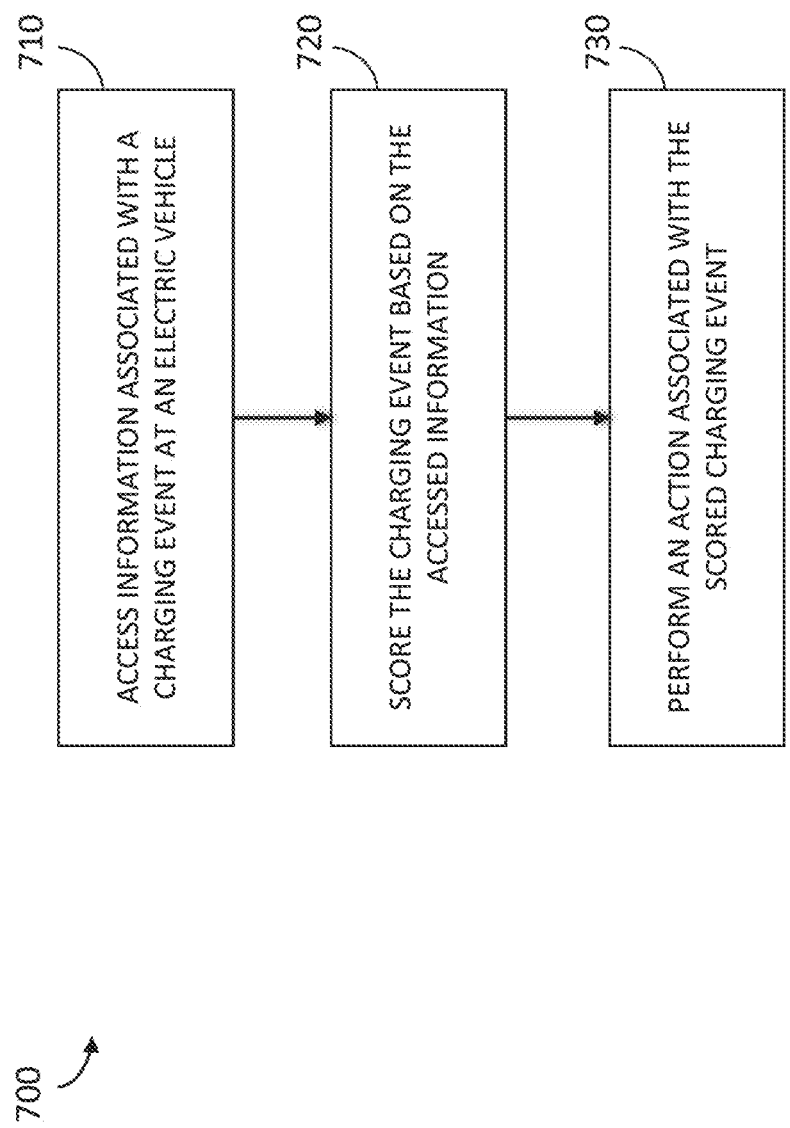
FIG. 7 is a flow diagram illustrating a method for performing an action associated with a scored charging event.

As described herein, the charging event ranking engine 160 may perform a variety of method or processes when scoring a completed charging event. FIG. 7 is a flow diagram illustrating a method 700 for performing an action associated with a scored charging event. The method 700 may be performed by the charging event ranking engine 160 and, accordingly, is described herein merely by way of reference thereto. It will be appreciated that the method 700 may be performed on any suitable hardware.

In operation 710, the charging event ranking engine 160 accesses information associated with a charging event at an electric vehicle. For example, the energy identification module 610 may access information associated with an energy source (e.g., a wind energy source, a solar energy source, a biofuel source, and/or other renewable energy sources) used to provide energy to the electric vehicle during the charging event, information associated with a cost of energy provided to the electric vehicle during the charging event, information associated with a ranking assigned to a charging station used during the charging event, and so on.

In operation 720, the charging event ranking engine 160 scores the charging event based on the accessed information. For example, the scoring module 620 may assign a relatively high score to the charging event when a renewable energy source is used to provide energy to the electric vehicle during the charging event, may assign a relatively low score to the charging event when the charging event occurs during a peak energy time period for an electric grid that provided the energy to the electric vehicle during the charging event, and so on. The scoring module 620 may perform some or all of the techniques described herein when scoring or ranking a charging event.

In operation 730, the charging event ranking engine 160 performs an action associated with the scored charging event. For example, the action module 630 may display an indication of a score assigned to the charging event via a mapping application associated with a driver of the electric vehicle, may present a reward to a driver of the electric vehicle that is based on a score assigned to the charging event, and so on.

Figure 8:
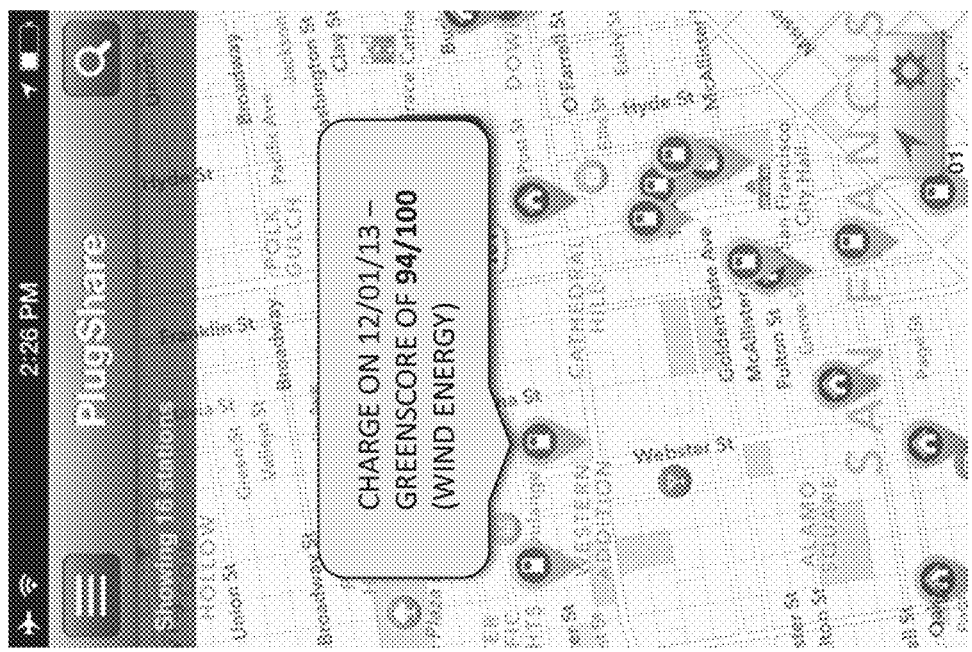
FIG. 8 is a display diagram illustrating an example display presenting a scored charging event.

As an example, FIG. 8 depicts an example display 800 presenting a scored charging event. The display 800 includes a map showing a charging station along with a display element that provides information associated with a score assigned to a recent charging event at the charging station. For example, the displayed information includes the date of the charging event (e.g., CHARGE ON Dec. 1, 2013), the score assigned to the charging event (e.g., GREENSCORE OF 94/100), and the source of the energy (e.g., WIND ENERGY). Of course, other information may be displayed.

Thus, in some example embodiments, the charging event ranking engine 160 may identify a source of energy used to charge an electric vehicle during a charging event, assign a score to the charging event based on the identified source of energy, and perform an action for a driver of the electric vehicle based on the score assigned to the charging event.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventors reserve the right to add additional claims after filing the application to pursue such additional claim forms for other aspects of the system.

We claim:

1. A method performed by a computing system of an electric vehicle, the method comprising:
   accessing context information associated with a potential charging event at a charging station,
      wherein the potential charging event is specific to the electric vehicle;
   determining a score for the potential charging event at the charging station based on the context information,
      wherein the context information includes a route to be traveled from a current location of the electric vehicle to a location of the charging station and information associated with reviews of previous charging events at the charging station,
      wherein the information associated with reviews of previous charging events at the charging station includes information based on a date-weighted average of binary station reviews obtained via check-in actions of electric vehicles at the charging station, and
      wherein the score for the potential charging event at the charging station is determined specifically for the potential charging event of charging the electric vehicle at the charging station and is dynamically determined upon accessing the context information;
   rendering an icon representative of the charging station along with an indicator of the score for the potential charging event at the charging station on a map presented by a mapping application associated with the electric vehicle and in communication with the computing system of the electric vehicle; and
   automatically reserving the charging station when the score for the potential charging event at the charging station is above a threshold score.

2. The method of claim 1, wherein the context information includes information identifying a current state of charge for the electric vehicle to be charged during the potential charging event.

3. The method of claim 1, wherein the context information includes information identifying a cost to charge the electric vehicle during the potential charging event and information identifying a source of renewable energy to be used during the potential charging event.

4. The method of claim 1, further comprising:
   receiving an indication that an actual charging event has occurred between the electric vehicle and the charging station;
   assigning a score to the actual charging event that is based on the score for the potential charging event at the charging station; and
   providing a reward to a driver of the electric vehicle that is based on the score assigned to the actual charging event.

5. The method of claim 1, wherein determining a score for the potential charging event at the charging station based on the context information includes dynamically updating a score previously assigned to the charging station based on the context information.

6. The method of claim 1, wherein determining a score for the potential charging event at the charging station based on the context information includes dynamically updating a score previously assigned to the charging station based on information identifying a state of charge for the electric vehicle.

7. A charging interface system, comprising:
a non-transitory memory storing instructions;
one or more processors coupled to the non-transitory memory and operable to execute the instructions from the non-transitory memory, the execution of the instructions causing the charging interface system to perform operations, the operations comprising:
receiving a request from an electric vehicle to charge the electric vehicle;
accessing context information associated with a future, potential charging event at a specific charging station for the electric vehicle, wherein the context information includes a route to be traveled from a current location of the electric vehicle to a location of the charging station and information associated with reviews of previous charging events at the charging station,
  wherein the information associated with reviews of previous charging events at the charging station includes information based on a date-weighted average of binary station reviews obtained via check-in actions of electric vehicles at the charging station;
determining a score for the future, potential charging event at the charging station based on the context information,
  wherein the score for the future, potential charging event at the charging station is determined specifically for the electric vehicle using the charging station during the future, potential charging event,
  wherein the score for the future, potential charging event at the charging station is dynamically determined based on the context information, and
  wherein the score for the future, potential charging event at the charging station is indicative of a suitability of the charging station for charging the electric vehicle during the future, potential charging event;
rendering a map presented to a driver of the electric vehicle; and
displaying an icon representative of the charging station along with an indicator of the score for the future, potential charging event at the charging station within the rendered map; and
automatically reserving the charging station on behalf of the electric vehicle when the score for the future, potential charging event at the charging station is above a threshold score.

8. The charging interface system of claim 7, the operations further comprising accessing information identifying a state of charge for the electric vehicle to be charged during the future, potential charging event.

9. The charging interface system of claim 7, the operations further comprising accessing information identifying a cost to charge the electric vehicle during the future, potential charging event and information identifying a source of energy to be used when charging the electric vehicle during the future, potential charging event at the charging station.

10. The charging interface system of claim 7, the operations further comprising updating a score previously assigned to the charging station based on the context information.

11. The charging interface system of claim 7, the operations further comprising updating a score previously assigned to the charging station based on information identifying a state of charge for the electric vehicle to be charged during the future, potential charging event.

12. The charging interface system of claim 7, the operations further comprising updating a score previously assigned to the charging station based on information identifying a predicted route currently traveled by the electric vehicle to be charged during the future, potential charging event.

13. A non-transitory computer-readable storage medium whose contents, when executed by a computing system of an electric vehicle, cause the computing system to perform operations, the operations comprising:
accessing context information associated with a potential charging event for the electric vehicle at a charging station; and
determining a score for the potential charging event at the charging station by:
  accessing a score assigned to the charging station that is previously calculated using information associated with reviews of previous charging events at the charging station, wherein the information associated with reviews of previous charging events at the charging station includes information based on a date-weighted average of binary station reviews obtained via check-in actions of electric vehicles at the charging station;
  determining context information for the potential charging event at the charging station,
    wherein the context information includes a route to be traveled from a current location of the electric vehicle to a location of the charging station, a current state of charge of a battery of the electric vehicle, and an energy source to be used to charge the electric vehicle during the potential charging event; and
  dynamically updating the score assigned to the charging station based on the context information, wherein the dynamically updated score is specific to the electric vehicle using the charging station during the potential charging event; and
automatically reserving the charging station on behalf of the electric vehicle when the score for the potential charging event at the charging station is above a threshold score.

* * * * *